United States Patent [19]
Gehrmann

[11] Patent Number: 5,719,640
[45] Date of Patent: Feb. 17, 1998

[54] CHROMAKEY METHOD AND ASSOCIATED CIRCUIT ARRANGEMENT

[75] Inventor: Rainer Gehrmann, Alsbach-Hähnlein, Germany

[73] Assignee: U.S. Philips Corporation, New York, N.Y.

[21] Appl. No.: 526,677

[22] Filed: Sep. 11, 1995

[30] Foreign Application Priority Data

Sep. 10, 1994 [DE] Germany .................. 44 32 337.9

[51] Int. Cl.$^6$ .................. H04N 9/74; H04N 9/75
[52] U.S. Cl. .................. 348/587; 348/586; 348/592
[58] Field of Search .................. 348/586, 587, 348/591, 592, 599, 590, 630, 631; 345/113, 114; H04N 9/74, 9/75

[56] References Cited

U.S. PATENT DOCUMENTS

| | | | |
|---|---|---|---|
| 4,811,084 | 3/1989 | Belmares-Sarabia et al. | 348/586 |
| 5,301,016 | 4/1994 | Gehrmann | 348/586 |
| 5,436,671 | 7/1995 | Gehrmann | 348/587 |
| 5,455,633 | 10/1995 | Gehrmann | 348/587 |

FOREIGN PATENT DOCUMENTS

| | | | |
|---|---|---|---|
| 4017878A1 | 12/1991 | Germany | H04N 9/75 |
| 6225329 | 8/1994 | Japan | H04N 9/75 |
| 2262860 | 6/1993 | United Kingdom | H04N 9/75 |
| 2263040 | 7/1993 | United Kingdom | H04N 9/75 |

*Primary Examiner*—John K. Peng
*Assistant Examiner*—Linus H. Lo
*Attorney, Agent, or Firm*—Edward W. Goodman

[57] ABSTRACT

A chromakey method and an associated circuit arrangement are intended for treating transition colors in color keying in which transition colors occur in video pictures, for example at the edges between foreground objects and the key color of the background of these objects. For the proposed treatment of the transition colors, inter alia the keying function (k) plays a decisive role. It indicates the key color component for each transition color. To define this keying function (k), parameters are applied to a computer (C), which parameters fix a key color ($|KC|,\theta,\Phi$), a transition color (Cb, Cr, Y) and a boundary region ($\alpha,\beta$). In the color space, the boundary region separates the color of the foreground of a video picture from all other colors which may occur in the video picture. The keying function (k) is determined by way of the equation for the boundary.

7 Claims, 2 Drawing Sheets

CHROMAKEY METHOD AND ASSOCIATED CIRCUIT ARRANGEMENT

BACKGROUND OF THE INVENTION

1. Field of the Invention

The invention relates to a chromakey method and an associated circuit arrangement.

2. Description of the Related Art

Chromakey in its widest sense is understood to mean mixing of two television pictures to one overall picture with the following purpose: the foreground of the first video picture should appear, possibly without errors, in front of the second television picture as a background (cf., for example DE 40 17 878 A1).

In order that the two pictures can be mixed automatically, the background of the first video picture should possibly have one color. Usually, blue is used for this purpose; it is referred to as the key color. The foreground of the first video picture should not contain this color, because obvious errors would then appear in the overall picture. In fact, during mixing, the color information of the first video picture is scanned pixel by pixel. If the color information corresponds to a pixel of the key color, this pixel is replaced by the data of the corresponding pixel of the second video picture. If the key color appeared in the foreground, this foreground would be transparent at these locations in the overall picture.

Refinements of the method are, for example, that also key color nuances instead of a single key color are allowed for the background of the first video picture. For the above-mentioned reasons, these nuances should neither occur in the foreground of the first video picture, and also because otherwise the simple criterion for the automatic distinction between foreground and background would be lost.

A difficult aspect of distinguishing between the foreground and the background is the phenomenon of transition colors in video pictures. Transition colors occur in video pictures, for example, at edges between foreground objects and the key color of the background of the foreground scene. If, for the sake of simplicity, a blue key color and a red foreground are used, a transition region in which the colors vary from red via purple to blue is present between the foreground and the background on the picture plane. These transition colors are caused, for example, by an optical defocus of the video camera or by filtering of the video pictures.

If the pixels of such a transition region are not replaced by corresponding pixels of the second video picture, i.e., excepted from color keying, the objects of the foreground appear in the overall picture, inter alia with a disturbing bluish or purple-colored rim. On the other hand, these pixels of the transition region cannot be completely replaced by corresponding pixels of the second video picture, because the result would then have an unnaturally hard appearance. For some color transitions (red-blue transition or green-blue transition) the key color component can be defined in the two-dimensional color plane. These transition colors have in common that they have vectorial cross-components with the vector of the key color and that this feature enables them to be split up into vectorial fundamental components. However, such a method typically fails when the color transition diametrically passes the color plane through the achromatic locus, thus, for example from yellow via the achromatic locus to blue. In fact, the yellow color has a direction which is inverse to the blue key color. Any arbitrary sum vector of these two color vectors thus no longer constitutes a parallelogram and cannot be split up into its fundamental components in a simple manner. Consequently, no value of the keying function (cf. below) can be indicated in the grey transition regions. Grey edges of yellow foreground objects after color keying are the inevitable result.

It is an object of the invention to provide a comprehensive and generally applicable method and a circuit arrangement for treating all transition colors during color keying.

Terms such as "color space", "color vector of a pixel" or "corresponding pixels" and others, as hitherto used and to be used hereinafter, will be defined as follows.

1. The color information of a pixel in its wider sense is understood to mean the two chrominance values Cb and Cr and the luminance value Y. Color information in its narrower sense is understood to mean only the two chrominance values Cb and Cr. If color information in general is concerned, the two explanations will apply to both cases.

2. The color information of a pixel is considered to be the point P of a color space with a cartesian system of coordinates whose coordinates are fixed by the color information of the pixel. Color information components in their wider sense are points in the three-dimensional color space $FR_3$ and color information components in their narrower sense are points in the two-dimensional color space $FR_2$. If the term color space is used in general, the definition will be independent of the dimension.

3. Points in the color space are also supposed to be vectors (color vectors) from the origin of the system of axes to the point P in the space. Thus, there is not always a sharp distinction between point and vector. Vectors are symbolized in bold print and indicated by means of an arrow head at their end in the Figures. x thus is an abbreviation of $(x_1, x_2, x_3)$ when a color vector (point) in $FR_3$ is concerned and an abbreviation of $(x_1, x_2)$ when a color vector (point) in $FR_2$ is concerned. $x_1$ is the associated Cb component, $x_2$ is the Cr component and $x_3$ is the Y component of the vector x. The meaning of the phrase "color vector of a pixel" will be apparent from the foregoing. The same applies to the phrase "color vectors of a video picture or of parts of a video picture". The part of the color space to which the key colors belong is referred to as the key region.

4. Scalar products between two vectors are abbreviated by a·b. Their meaning is $$(1)\ a \cdot b = \Sigma a_i b_i$$

in which the sum index i for vectors of the space $FR_2$ ranges from 1 to 2 and for vectors of the space $FR_3$ ranges from 1 to 3. The amount of a vector |a| is understood to be its euclidic norm, viz.

$$(2)\ |a| = \sqrt{\Sigma a_i^2}.$$

For the sum index the same applies as for the scalar product.

5. Two pixels which belong to two different video pictures are defined as being corresponding if they have the same geometrical coordinates on the picture plane.

The object of the method according to the invention is solved by means of the following steps:

a) the color space is divided into two sub-spaces by an [n−1]-dimensional boundary region in such a way that the first sub-space comprises the key region and possible transition colors, while the second sub-space and the boundary region comprise the color vectors of the first video picture which are associated with its foreground, b) for a color vector $p_1$ which is located within the first sub-space, a color vector KC of the key region defines the value of a keying function $k(p_1)(0 \leq kp_1) \leq 1)$ by way of the requirement that the end point of the vector $p_1-k(p_1)KC$ is located in the boundary region.

The invention is based on the hypothesis that transition colors may have been created by additive color mixing between a foreground color of the first picture and a part, still to be defined, of a color KC of the key region. This part—here denoted as the value of a keying function $k(p_1)$ at the position $p_1$—is defined in accordance with the above-mentioned requirements for a transition color $p_1$.

The above-mentioned hypothesis also means that the values of the keying function $k(p_1)$ should be positive numbers with $0 \leq k(p_1) \leq 1$. At many positions, the argument $p_1$ of the keying function k is omitted for the sake of brevity.

By possible inclusion of the luminance component in the treatment of transition colors according to the invention, problems can be solved which cannot be solved in a simple manner in the two-dimensional space (cf. above).

Once a keying function has been determined, the overall picture is obtained in that the color vector $p_3$ of a pixel of the overall picture, which, with respect to a pixel of the first video picture, corresponds to the transition color $p_1$ and with respect to a pixel of the second video picture corresponds to the color vector $p_2$, is defined in accordance with the equation $$(2) \; p_3 = p_1 - k(p_1)KC + k(p_1)p_2.$$

The component $k(p_1)$ of the key color KC in a transition color $p_1$ is subtracted therefrom. This eliminates the color mixing. Simultaneously, the same component of a color $p_2$ of the second video picture is added.

These and other aspects of the invention will be apparent from and elucidated with reference to the embodiments described hereinafter.

DESCRIPTION OF THE PREFERRED EMBODIMENT

Figure 1:
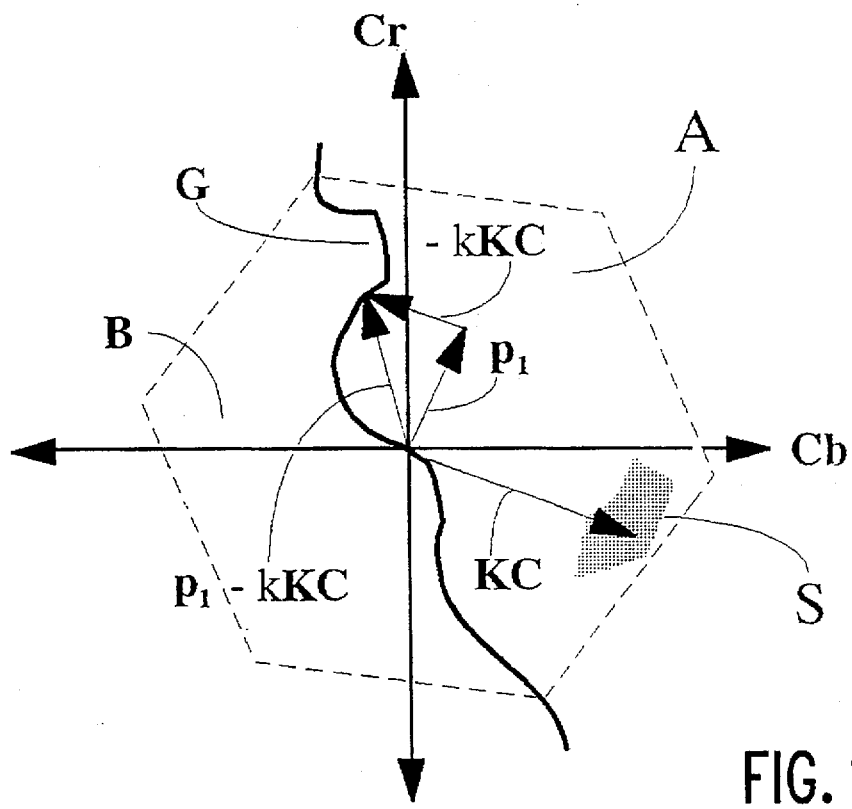
FIG. 1 illustrates the invention in its most general form for a two-dimensional color space i.e. for a color plane.

FIG. 1 shows the two-dimensional color space $FR_2$—as usual, also referred to as color plane hereinafter—with the generally determined system of coordinates Cb and Cr whose origin coincides with the black point.

For the purpose of orientation, a hexagon is shown at whose edges—starting at the first quadrant of the color plane—the colors purple, red, yellow, green, cyan and blue are located when one passes through the hexagon counter-clockwise.

The color plane $FR_2$ shows a shaded region, a key region S and a boundary region as boundary curve G. The boundary curve G divides the color plane $FR_2$ into two sub-planes, viz. the sub-planes A and B. The sub-plane B comprises the foreground colors of a first video picture, while the sub-plane A comprises the key color and possible transition colors. Not all colors of the sub-plane B should actually occur as foreground colors in a video picture. It also holds for the sub-plane A that not all possible transition colors necessarily occur as transition colors in a video picture. Those foreground colors from which the transition colors have originated by additive color mixing—in accordance with the above-mentioned hypothesis—are located on the boundary curve G.

If the color vector $p_1$ of a pixel has the location shown—this vector represents an actually occurring transition color—it has originated from a color of the boundary region G by admixing of vector KC from the key region S. If the correct component k of KC is subtracted from $p_1$, the end point of the color vector $p_1-kKC$ is located on the boundary curve G, i.e., the color vector $p_1-kKC$ complies with the equation $$(3) \; g(p_1-kKC)=0,$$

when $g(x)=0$ is the equation of the boundary curve. k must then be determined from the equation (3). The component k is dependent, inter alia on $p_1$; therefore it is also referred to as the keying function $k(p_1)$. By definition, the values of the keying function for points of the sub-plane B and for points of the boundary curve G are fixed at zero and at one for the key color. It is thereby explained for each point of the color space. A keying function is defined by the boundary region G and the vector KC. Any change of the boundary region G and any change of the vector KC generally leads to a different keying function.

For example, if two picture sequences are to be automatically mixed to an overall picture sequence, the main task is to find a keying function which is appropriate for the overall sequence. In the process described above it is assumed that the color composition of the pictures of the first sequence, which should present the foreground for the overall pictures, is essentially the same for all pictures of this sequence. If the foreground of the pictures of the first sequence is, for example, a newsreader, everything else will relate to one and the same reader wearing the same clothing in front of the same (blue) background.

First, the key color KC having the largest intensity is determined by exact measurement. Subsequently, a boundary curve G is found with plausible arguments. The associated values of the keying function $k(p_1)$ are determined—possibly automatically—for all color points $p_1$ of the color space. It is thus presupposed that the equation for the boundary region (boundary curve) $g(x)=0$ to be satisfied by the points $p_1-kKC$, can be solved to k without elaborate operations. Examples will be given below.

As $g(x)$ and KC have been fixed, a given keying function can be defined and is determinable for each point $p_1$ of the color space. Their values may be stored in a memory. A master picture of the first picture sequence is then changed by means of the determined keying function. The master picture is understood to mean a picture of the first picture sequence having the same background and foreground color composition as the pictures of the overall first picture sequence. A further conformity is not required.

The change of the master picture is effected in such a way that a component $k(p_1)KC$ is subtracted from a color vector $p_1$ of each pixel of this master picture, where $k(p_1)$ stands for the previously determined keying function. It can be said that the blue component of the master picture is removed by this process. In so far as this has been realized by the choice of the boundary curve g and the key color KC—thus by the keying function fixed thereby—, is judged by way of visual inspection. The master picture in which the blue color has been removed then shows the foreground in front of a black background. The picture should look as if a blue color had never been used. If this is not the case, the process is repeated by means of a changed boundary curve and possibly by means of a changed key color KC. If the result is satisfactory, the process of adjustment has ended and an appropriate keying function has been found.

The two picture sequences are then automatically mixed at a rate corresponding to the pixel frequency. A color vector $p_3$ for a pixel of the overall picture is obtained from the color vectors $p_1$ and $p_2$ of the corresponding pixels in accordance with the equation (4) $p_3 = p_1 - k(p_1)KC + k(p_1)p_2$ For the color vector $p_2$ of a pixel of the second picture sequence it thus holds that an equal quantity is admixed as the quantity of blue which was previously visible and was subtracted from the color vector $P_1$.

FIG. 1 shows how the conditions in color space $FR_3$ prevail for the most general case. In this case, the point set S is a three-dimensional point set and the point set G is a two-dimensional point set.

For the three-dimensional color space $FR_3$, an embodiment will now be described on the basis of the following simplified assumption:

the boundary region G is a plane passing through the origin, whose points x are defined by the equation (5) $x \cdot n = 0$ in which n is a vector in the direction of the plane normal and the point between the two vectors again indicates its scalar product.

Only color vectors which are located in the plane defined by equation (5) are color vectors of the foreground from which the transition colors have been obtained by admixing a key color KC. This means that the vector $p_1 - kKC$ should satisfy the plane equation (5). The use of $p_1 - kKC$ in equation (5) yields the value (6) $k(p_1) = (p_1 \cdot n) : (KC \cdot n)$ for the associated keying function at the location $p_1$. k thus results as the quotient of the scalar products $p_1 \cdot n$ and $KC \cdot n$.

The simplifications for the color space $FR_3$ have the advantage that the boundary plane can be realized in a technically simple manner by virtue of the simple mathematical description and that the location of the boundary plane can be quickly varied by changing the normal vector n.

Formula (6) may be evaluated in different ways. Either the three components of the vectors $p_1$, n and KC are used, referring to the definition of the scalar product in accordance with formula (1), or angles are introduced as a characterization of the geometrical relation. The use of angles in the color space will be further described below.

Figure 2:
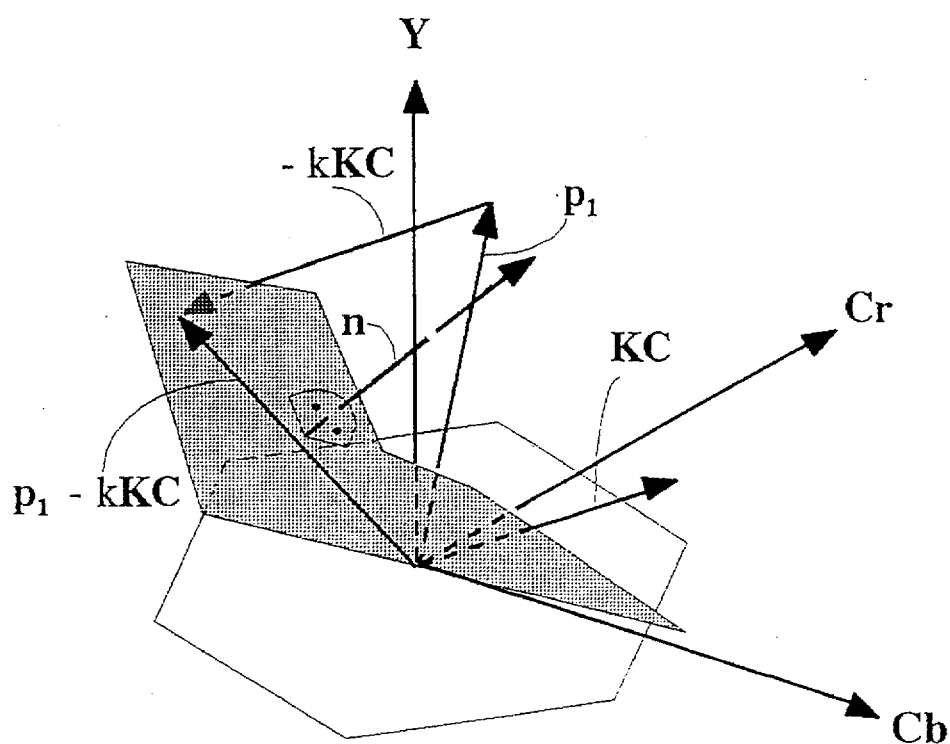
FIG. 2 illustrates a special embodiment of the invention in a three-dimensional color space, FIG. 3 geometrically illustrates angles fixed by one key color.

In the perspective representation shown in FIG. 2, the boundary plane is made visible by way of a shaded section. This plane divides the space $FR_3$ into two sub-spaces. The sub-space which, viewed from the viewer's side, is located behind the plane is the sub-space A and the space located in front is the sub-space B. The normal vector n of the plane is located at a point on the plane and points towards the sub-space A. The vector n is perpendicular to the plane, i.e. to each vector which is completely located in the plane. This situation is indicated by the two curves with the points at the beginning of the vector n—the conventional sign for straight angles. The single vector KC of the key region is also located in the sub-space A. Moreover, the color vector $p_1$ of a pixel of the first video picture is located in the sub-space A. It represents a transition color. The vector KC multiplied by the keying function k is now subtracted from this color vector. As stated above, the keying function k is defined in such a way that the sum of the vectors $p_1$ and $-kKC$ results in a vector whose end point is located in the boundary plane. This difference vector is denoted by $p_1 - kKC$ in FIG. 2.

A somewhat more complicated region is a boundary region which is constructed by means of two intersecting planes passing through the origin. The boundary region itself then consists of two half planes which are bounded by the common line of intersection of the planes. The equation for the boundary region would be linear (and homogeneous) for each region in this case. For the two planes, plane normals $n_1$ and $n_2$ should be indicated. Points of the boundary region then comply with the equation (5) with $n=n_1$ or with $n=n_2$ or for $n_1$ and $n_2$ when they are located on the line of intersection of the planes. Dependent on the position of KC and $p_1$, a value in accordance with equation (6) with $n=n_1$ or with $n=n_2$ is obtained for the keying function.

It should be noted that the exceptional cases described are fully applicable to space $FR_2$. The equations (1) and (2) can be taken over in an identical form. The only difference is that all vectors occurring therein have only two components. Equation (4) is then the equation of a straight line passing through the origin. In the more complicated case, the boundary region consists of two half straight lines whose starting point is the origin. The three-dimensional treatment of the problem is, however, to be preferred if no or only unsatisfactory solutions are obtained with the two-dimensional treatment.

When evaluating formula (6), it should be considered that only the position of the boundary plane and, in exceptional cases, the value of the vector KC is changed for the purpose of adjustment. The change of the value of KC means that the intensity of the key color is changed (for example, by changing the scene illumination or the camera aperture). It is therefore advantageous to rearrange formula (6) in such a way that all independent parameters which might be changed during adjustment appear explicitly in this formula. To this end, the Cb-Cr-Y system of coordinates is considered to be rotated in such a way that the vector KC in the rotated system of coordinates is represented by (7) $KC = \{|KC|, 0, 0\}$ The components of an arbitrary vector $p_1$ in the rotated system of coordinates are denoted by r, s and t. The boundary plane intersects the r-s plane in a straight line which encloses an angle $\alpha$ with the r axis. The same applies to the r-t plane and an angle $\beta$. These two angles fix the boundary plane and can be changed independently of each other. If this is taken into account in formula (6), the initial result is (8) $k(p_1) = \{r + s^* n_2/n_1 + t^* n_3/n_1\} / |KC|$ with $n_i$ as the components of the vector n in the rotated system of coordinates. These component relations can, however, be represented by said angles. It holds that (9) $n_2/n_1 = -\cot \alpha$ and $n_3/n_1 = -\cot \beta$ and

(10) $\{r-s^* \cot \alpha - t^* \cot \beta\}/|KC|$ is finally obtained from (8).

The components r, s and t of a vector $p_1$ in the rotated system of coordinates are obtained from their components in the Cb-Cr-Y system by transformation by the matrix $$\begin{vmatrix} \sin\theta\cos\Phi & \sin\theta\sin\Phi & \cos\theta \\ -\sin\Phi & \cos\Phi & 0 \\ -\cos\theta\cos\Phi & -\cos\theta\sin\Phi & \sin\theta \end{vmatrix} \quad (11)$$

which itself is again a product of the two matrices $$\begin{vmatrix} \sin\theta & 0 & \cos\theta \\ 0 & 1 & 0 \\ -\cos\theta & 0 & \sin\theta \end{vmatrix} \text{ and } \begin{vmatrix} \cos\Phi & \sin\Phi & 0 \\ -\sin\Phi & \cos\Phi & 0 \\ 0 & 0 & 1 \end{vmatrix} \quad (12)$$

(in the given sequence). The right-hand matrix represents the transition to a provisional system of axes obtained by rotation about the Y axis. The angle of rotation is the angle Φ. The left-hand matrix represents the rotation about an axis of the provisional system of coordinates, viz. by the angle 90° −θ. The angles of rotation are obtained from the representation of the vector KC in the spherical coordinates in the Cb-Cr-Y system, viz.

(13) $KC = |KC|\{\sin\theta\cos\Phi, \sin\theta\sin\Phi, \cos\theta\}$.

Figure 3:
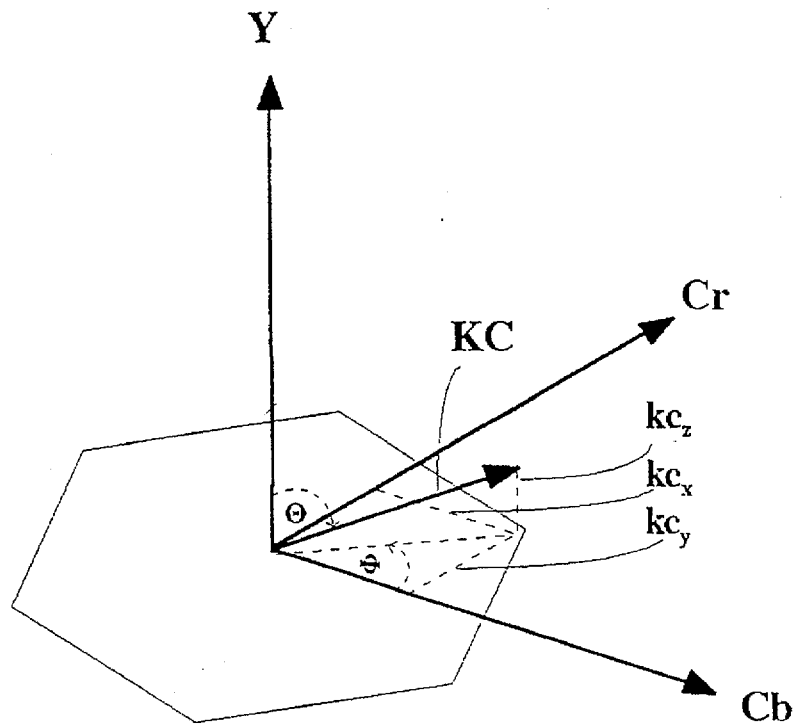

This representation can then be calculated in known manner from the cartesian components $kc_x$, $kc_y$ and $kc_z$ of the vector KC in the Cb-Cr-Y system. The geometrical relations explained above and to be further explained hereinafter are shown once more in FIG. 3. The transformation of the vector KC according to (13) with the matrix (11) results in the representation of KC according to formula (7), as is clearly evident.

Figure 4:
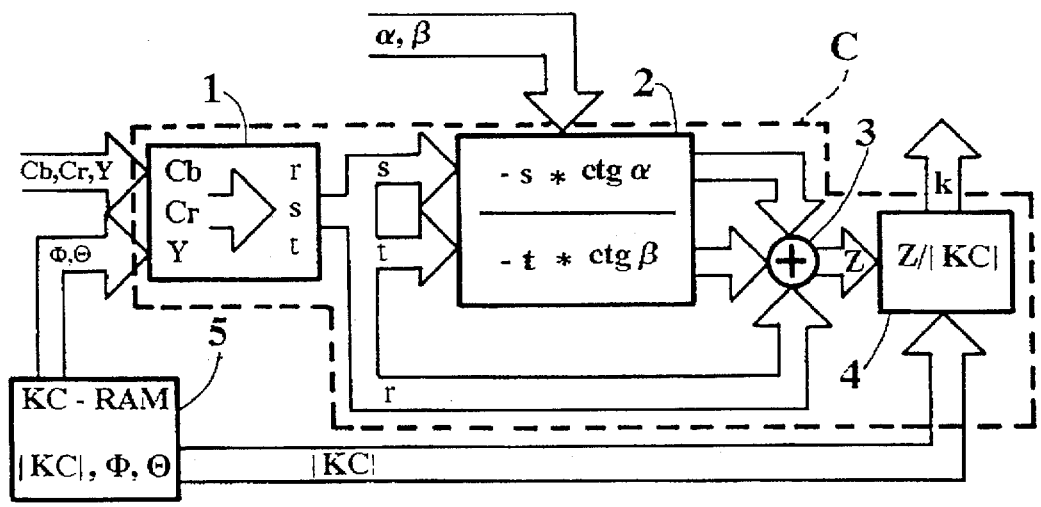
FIG. 4 shows a circuit arrangement for computing a keying function.

FIG. 4 shows a circuit arrangement comprising conventional components, with which the keying function is determined. The parameters fixing the vector KC of the key color in accordance with equation (13) are stored in a memory 5, viz. the value |KC|, the angle Φ enclosed by its projection on the Cb-Cr plane with the Cb axis, and its angle θ at the Y axis. The two angles Φ and θ are applied to a transformation unit 1 which itself is a component of a super-ordinate computer C. The transformation unit 1 transforms the components Cb, Cr and Y of a color vector $p_1$ with the matrix (11). This results in the components r, s and t of the vector $p_1$ in a system of axes which is rotated with respect to the original system of axes.

To calculate the numerator Z of equation (10), the components r and s are applied to a unit 2. The angles α and β defining the boundary plane are also applied to this unit. An adder 3 adds the products $s^* \cot\alpha$ and $t^* \cot\beta$ computed by the unit 2 to the component r. The result is the numerator Z of equation (10). A dividing unit 4 divides the numerator Z by the value of the vector KC which is applied to the unit 4 of the memory 5. The quotient is the value of the keying function k for the color vector $p_1$.

I claim:

1. A chromakey method in which the pixel data of a first video picture are mixed with the pixel data of a second video picture in such a way that parts of the first video picture represent the foreground and the second video picture represents the background of an overall picture, and in which all color vectors associated with the background of the first video picture constitute a key region (S) in an n-dimensional color space, where n is an integer equal to or greater than 3, characterized in that the method comprises the following steps:

a) dividing the color space into two sub-spaces (A,B) by an (n−1)-dimensional boundary region (G) in such a way that the first sub-space (A) comprise the key region (S) and possible transition colors, while the second sub-space (B) and the boundary region (G) comprise the color vectors of the first video picture which are associated with its foreground; and b) for a color vector $p_1$ which is located within the first sub-space (A), defining the value of a keying function $k(p_1) (0 \leq k(p_1) \leq 1)$ as a color vector KC of the key region (S) by way of the requirement that the end point of the vector $p_1 - k(p_1)KC$ is located in the boundary region (G).

2. A method as claimed in claim 1, characterized in that the color vector $p_3$ of a pixel of the overall picture, which with respect to a pixel of the first video picture corresponds to the transition color $p_1$ and with respect to a pixel of the second video picture corresponds to the color vector $p_2$, is defined in accordance with the equation $$p_3 = p_1 - k(p_1)KC + k(p_1)p_2.$$

3. A method as claimed in claim 1, characterized in that the points of the boundary region (G) comply with an equation $$g(x) = 0$$

so that the vector $p_1 - k(p_i)KC$ complies with the equation $$g(p_1 - k(p_1)KC) = 0.$$

4. A method as claimed in claim 3, characterized in that the equation $$g(x) = 0$$

is linear per region.

5. An arrangement for performing a chromakey mixing in which the pixel data of a first video picture are mixed with the pixel data of a second video picture in such a way that parts of the first video picture represent the foreground and the second video picture represents the background of an overall picture, and in which all color vectors associated with the background of the first video picture constitute a key region (S) in an n-dimensional color space, where n is an integer equal to or greater than 3, characterized in that the arrangement comprises:

means for dividing the color space into two sub-spaces (A,B) by an (n−1)-dimensional boundary region (G) in such a way that the first sub-space (A) comprises the key region (S) and possible transition colors, while the second sub-space (B) and the boundary region (G) comprise the color vectors of the first video picture which are associated with its foreground, wherein the points of the boundary region (G) comply with an equation $g(x) = 0$ so that the vector $p_1 - k(p_1)KC$ complies with the equation $g(p_1 - k(p_1)KC) = 0$; and means for defining, for a color vector $p_1$ which is located within the first sub-space (A), the value of a keying function $k(p_1) (0 \leq k(p_1) \leq 1)$ as a color vector KC of the key region (S) by way of the requirement that the end point of the vector $p_1 - k(p_1)KC$ is located in the boundary region (G).

6. An arrangement as claimed in claim 5, characterized in that said dividing means and said defining means comprise:

means for providing parameters fixing a key color KC (|KC|, Φ,Θ), a transition color $p_1$(Cb, Cr, Y) and a boundary region (α,β);

a transformation unit coupled to said providing means for transforming the transition color $p_1$ to components r, s and t in a rotated coordinate system in response to the key color parameters $\Phi$ and $\Theta$ in accordance with the matrix:

$$\begin{vmatrix} \sin\Theta\cos\Phi & \sin\Theta\sin\Phi & \cos\Theta \\ -\sin\Phi & \cos\Phi & 0 \\ -\cos\Theta\cos\Phi & -\cos\Theta\sin\Phi & \sin\Theta \end{vmatrix};$$

and means for calculating the value of k from the components r, s and t in response to the key color parameter |KC| and the boundary region parameters $\alpha$ and $\beta$ in accordance with $$k(p_1) = (r - s^* \cot \alpha - t^* \cot \beta)/|KC|.$$

7. An arrangement as claimed in claim 6, characterized in that said transformation unit and said calculating means are components of a computer (C).

* * * * *